Patented Oct. 18, 1927.

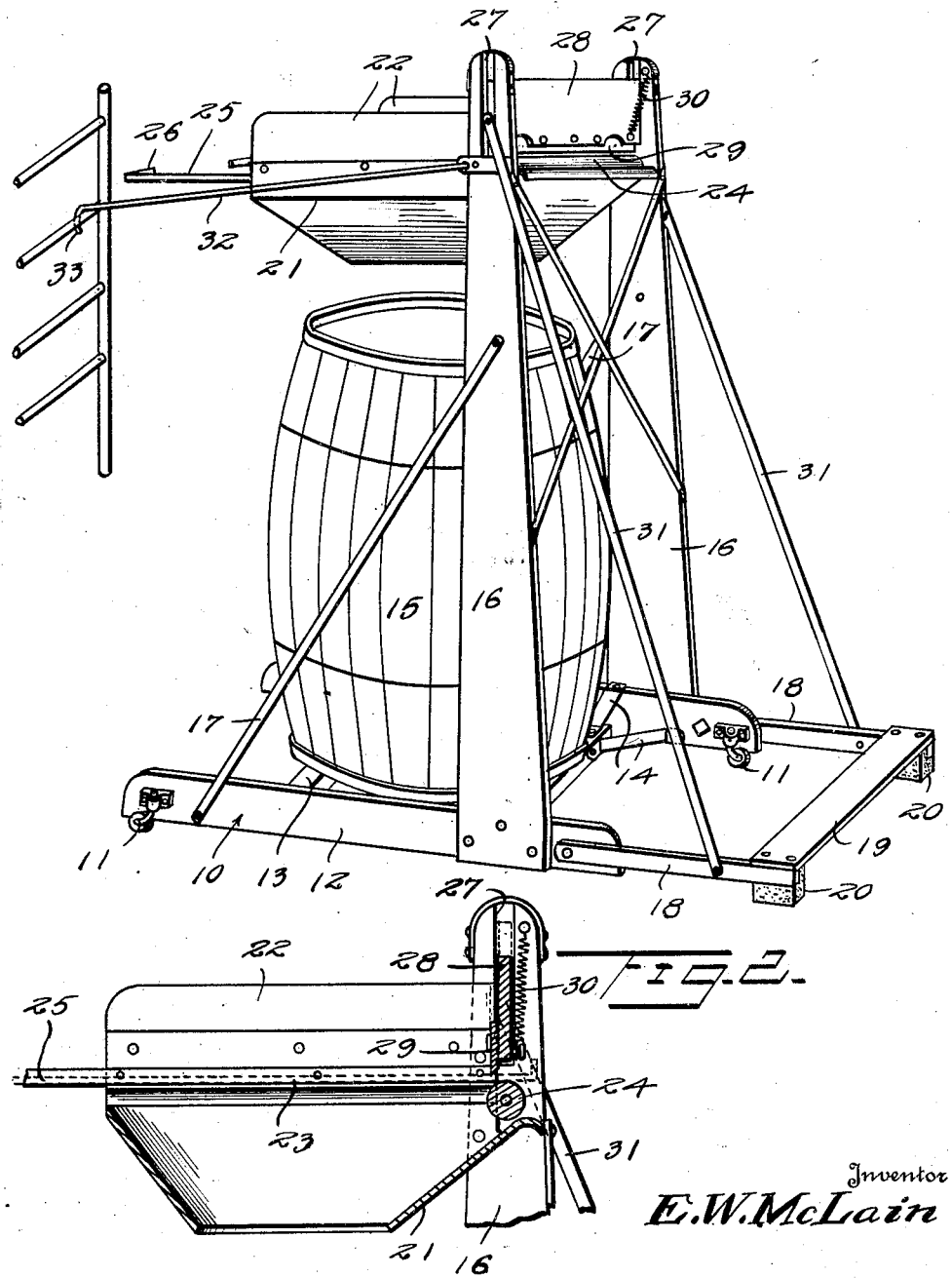

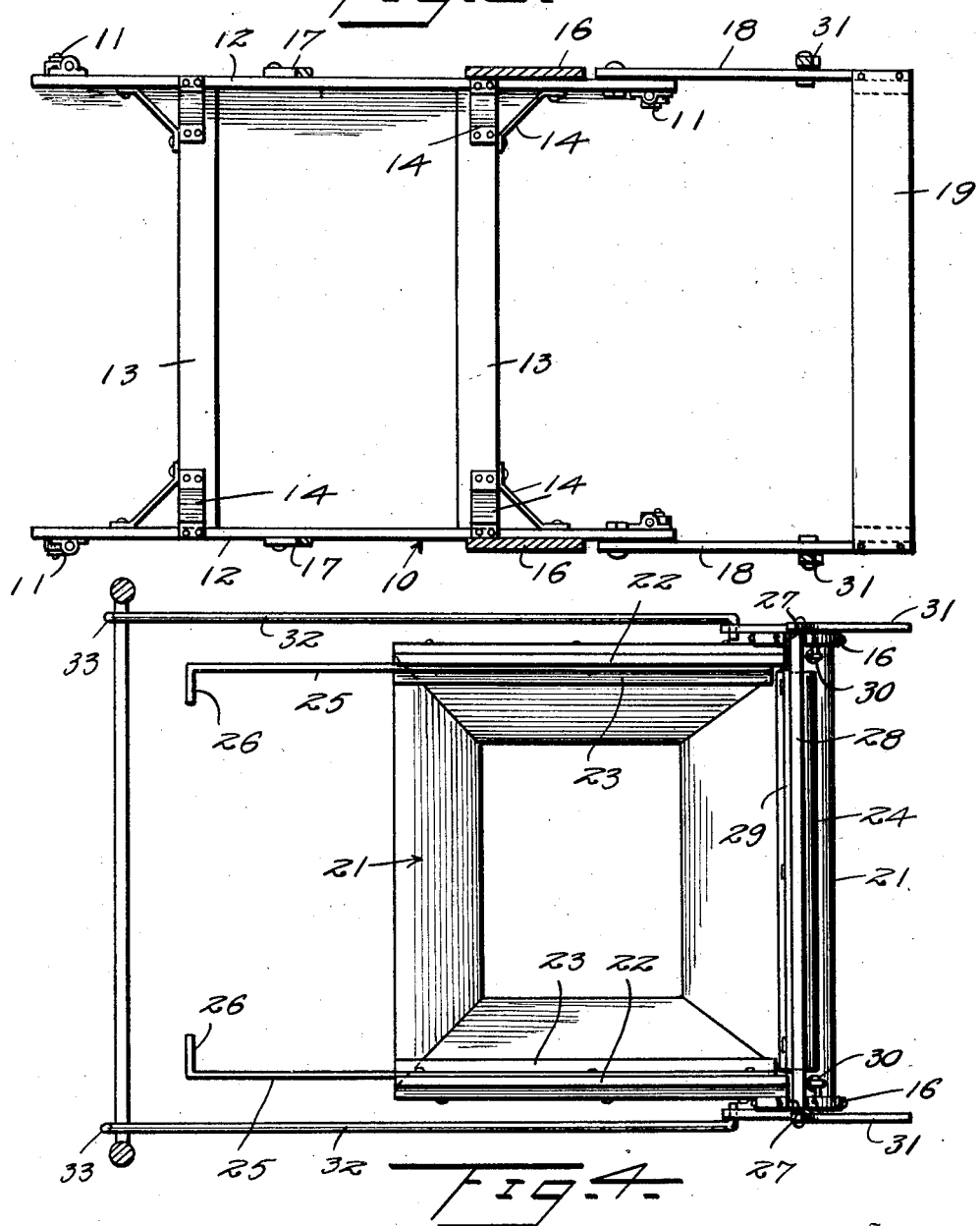

1,646,303

UNITED STATES PATENT OFFICE.

EDGAR W. McLAIN, OF HIGGINSVILLE, MISSOURI.

PAN SCRAPER.

Application filed June 26, 1926. Serial No. 118,863.

This invention relates to a pan scraper and more particularly to a device for scraping the battery pans of poultry houses.

An important object of the invention is to provide a device of this character which may be readily transported from place to place and which embodies means not only for scraping the pan in a rapid and efficient manner, but likewise provides a support for a refuse receptacle into which the material cleaned from the pan may pass.

A further object of the invention is to provide a device of this character having a vertically reciprocable scraper and pan guides associated with the scraper for preventing movement of the pan away from the scraper, the scraper being operable by the foot of the operator, so that his hands are left free for manipulation of the pan.

These and other objects I attain by the construction shown in the accompanying drawings, wherein for the purpose of illustration is shown a preferred embodiment of my invention and wherein:—

Figure 1 is a perspective view of a pan scraper constructed in accordance with my invention;

Figure 2 is a transverse sectional view through the hopper and associated mechanism;

Figure 3 is a transverse sectional view through the supports showing the construction of the supporting platform;

Figure 4 is a top plan view of the hopper showing the manner in which the hooks are engaged with the support to prevent the platform and hopper from shifting.

Referring now more particularly to the drawings, the numeral 10 generally designates a platform supported by casters 11. In the present illustration, this platform includes side members 12 and transverse members 13 to which the side members are braced, as at 14. The transverse members 13 are arranged to provide a support for a refuse receptacle 15, such as a barrel or the like. Extending upwardly from each of the members 12 is a vertical standard 16 suitably braced to the side members, as at 17, and each side member has pivoted thereto adjacent one end thereof an arm 18. The outer ends of these arms are connected by a treadle board 19 and the arms have associated therewith stops 20 limiting downward movement of the arms when they reach a substantially horizontal position. A rectangular hopper 21 is secured to the upper ends of the standards 16 and has at those sides thereof confronting the standards upstanding flanges 22, to the inner faces of which are secured inwardly directed horizontal guides 23. The adjacent faces of the flanges are spaced apart a distance equal to the width of the battery pan with which the device is to be employed and the edges of the pan rest upon the flanges 23. Between the standards 16 is journaled a roller 24, the upper surface of which is flush with the upper surface of the flanges and receives the bottom of the pan which is being cleaned. From each flange 22 an arm 25 projects in substantial alignment with the flange, the outer end of each arm having an inturned portion 26 against which the pan engages when it has been projected over the slides a predetermined distance. These arms are made of such length that the forward edge of the pan is disposed adjacent the roller when the rear edge of the pan is engaged with the stops.

The upper ends of the standards are provided with vertically extending slots 27 substantially radial to the axis of the roller, these slots forming slide guides for the ends of a transversely extending slide 28. To this slide is secured a scraper blade 29 which is of substantially the same width as the pan which is to be cleaned. Each end of the slide 28 is connected with the upper end of the associated support by a spring 30 and each end of the slide is further connected with a corresponding arm 18 of the platform structure by a link 31. At one or both of the standards 16 is pivoted a rod 32, the free end of which is hooked, as at 33, for engagement with a fixed element, so that it serves to prevent movement of the device in a manner hereinafter more fully set forth.

In the operation of the device, the platform is shifted to the point where the battery pans are located and when properly positioned is attached to a fixed point by the rod 32. The pans are then each inserted between the blade 29 and roller 30 until the stop 26 limits their movement. These pans are made in many different forms, but in each instance are in the form of a flat sheet. Sometimes flanges are provided at the front and side edges of the pan to permit the pan to be handled without accidental dumping of the refuse. The back edge of the sheet is always left unflanged, so that the refuse may be readily scraped therefrom. As the pan is being inserted, the slide 28 and its associated scraper blade are maintained in elevated position by the springs 30 and the treadle 19 is accordingly likewise elevated. After the pan is in position, the operator places his foot upon the treadle 19, forcing it down until the stops 20 come into engagement with the floor of the poultry house, then grasps the forward edge of the pan, with the upper surface of which the blade 29 is now engaged, and draws the pan from between the scraper blade and roller. The scraper removes the refuse from the upper surface of the pan and causes it to discharge over the rear edge of the pan into the hopper 21 and through this hopper to the refuse receptacle 15. As the pan is being drawn from between the roller and scraper, movement of the platform 12 is prevented by the arm 32. Where a convenient fixed point is not presented for engagement by the arm 32, movement of the platform may be prevented by increasing the pressure upon the treadle 19 and accordingly the frictional engagement between the stops 20 and the floor of the poultry house.

Since the construction hereinbefore set forth is capable of a certain range of change and modification without materially departing from the spirit of the invention, I do not limit myself to such specific structure except as hereinafter claimed.

I claim:—

1. In a device of the type described, a portable receptacle support, standards extending upwardly therefrom, a hopper carried by the standards and discharging into a receptacle carried by the support, a scraper blade vertically reciprocable adjacent one edge of the hopper, pan guides carried by the hopper and supporting the sides and bottom of the pan, means yieldably maintaining the scraper blade in spaced relation to a pan supported by the guide and means for shifting the scraper blade downwardly to engage the upper surface of a pan supported from said guide.

2. In a device of the type described, a portable receptacle support, standards extending upwardly therefrom, a hopper carried by the standards and discharging into a receptacle carried by the support, a scraper blade vertically reciprocable adjacent one edge of the hopper, pan guides carried by the hopper and supporting the sides and bottom of the pan, means yieldably maintaining the scraper blade in spaced relation to a pan supported by the guide, means for shifting the scraper blade downwardly to engage the upper surface of a pan supported from said guide and means associated with the hopper and engaging one edge of the pan to limit movement thereof when the opposite edge of the pan is substantially aligned with the scraper blade.

3. In a device of the type described, a portable receptacle support, standards extending upwardly therefrom, a hopper carried by the standards and discharging into a receptacle carried by the support, a scraper blade vertically reciprocable adjacent one edge of the hopper, pan guides carried by the hopper and supporting the sides and bottom of the pan, means yieldably maintaining the scraper blade in spaced relation to a pan supported by the guide, means for shifting the scraper blade downwardly to engage the upper surface of a pan supported from said guide and an arm pivoted to one of said standards having a hooked end for engagement with a fixed support.

4. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest and a scraper blade reciprocable toward and away from the roller and adapted to engage the upper surface of a pan.

5. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest, a scraper blade reciprocable toward and away from the roller and adapted to engage the upper surface of a pan, means normally maintaining the scraper blade in spaced relation to the roller and a treadle for forcing the scraper blade downwardly.

6. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest, a scraper blade reciprocable toward and away from the roller and adapted to engage the upper surface of a pan, means normally maintaining the scraper blade in spaced relation to the roller, a treadle for forcing the scraper blade downwardly and means for limiting the downward movement of the treadle.

7. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest, a scraper blade reciprocable toward and away from the roller and adapted to engage the upper surface of a pan, means normally maintaining the scraper blade in spaced relation to the roller, a treadle for forcing the scraper blade downwardly and means for limiting the downward movement of the treadle engaging with a surface upon which the receptacle support is arranged to thereby frictionally resist movement of the receptacle support when the treadle is depressed.

8. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest, a scraper blade reciprocable toward and away from the roller and adapted to engage the upper surface of a pan and means extending outwardly from said flanges having portions for engagement with a pan to limit its movement upon said ledges with one edge thereof substantially aligned with the scraper blade.

9. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest and a scraper blade reciprocable toward and away from the roller and adapted to engage the upper surface of a pan, the upper ends of the standards having vertically extending slots, a slide disposed in the slots and to which the blade is secured.

10. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest, a scraper blade reciprocable toward and away from the roller and adapted to engage the upper surface of a pan, the upper ends of the standards having vertically extending slots, a slide disposed in the slots and to which the blade is secured, springs connecting said slide with the standards at the upper ends thereof and urging said slide upwardly, a treadle pivoted to the receptacle support and a link connecting the treadle and slide.

11. In a device of the type described, a portable receptacle support, standards extending upwardly therefrom, a hopper carried by the standards and positioned to discharge into a receptacle carried by the support, flanges extending upwardly from opposite sides of the hopper and having inwardly directed ledges for the reception of the side edges of a pan, a roller extending transversely of the hopper and upon which the bottom of the pan is adapted to rest, a scraper blade reciprocable toward and away from the roller and adapted to engage the upper surface of a pan, the upper ends of the standards having vertically extending slots, a slide disposed in the slots and to which the blade is secured, springs connecting said slide with the standards at the upper ends thereof and urging said slide upwardly, a treadle pivoted to the receptacle support, a link connecting the treadle and slide and a stop block secured to the under surface of the treadle adapted to engage with the ground to limit downward movement of the treadle when depressed.

12. In a device of the type described, a hopper, a scraper blade vertically adjustable toward and away from one edge of the hopper, pan guides carried by the hopper and adapted to support a pan for movement in a direction transverse to the scraper blade, means for shifting the scraper blade into engagement with the upper surface of a pan supported from said guide and means yieldably urging the blade in the opposite direction.

13. In a device of the type described, a hopper, a scraper blade vertically adjustable toward and away from one edge of the hopper, pan guides carried by the hopper and adapted to support a pan for movement in a direction transverse to the scraper blade, means for shifting the scraper blade into engagement with the upper surface of a pan supported from said guide, means yieldably urging the blade in the opposite direction and a roller associated with the hopper and adapted to engage the pan at the under surface thereof and in opposition to the scraper blade.

14. In a device of the type described, a hopper, a scraper blade vertically adjustable toward and away from one edge of the hopper, pan guides carried by the hopper and adapted to support a pan for movement in a direction transverse to the scraper blade, means for shifting the scraper blade into engagement with the upper surface of a pan supported from said guide, means yieldably urging the blade in the opposite direction and means for checking motion of a pan upon the guide when one edge thereof is substantially aligned with said scraper blade.

In testimony whereof I hereunto affix my signature.

EDGAR W. McLAIN.